United States Patent [19]

Keim

[11] 4,214,182
[45] Jul. 22, 1980

[54] SUPPORT STRUCTURE FOR ARMATURE CONDUCTORS

[75] Inventor: Thomas A. Keim, Clifton Park, N.Y.

[73] Assignee: General Electric Company, Schenectady, N.Y.

[21] Appl. No.: 917,170

[22] Filed: Jun. 20, 1978

[51] Int. Cl.$^2$ .............................................. H02K 1/00
[52] U.S. Cl. .................................... 310/216; 310/214; 310/258
[58] Field of Search .................. 310/214, 42, 43, 258, 310/179, 191, 193, 194, 51, 254, 259, 216–218, 192, 91; 336/130–134

[56] References Cited

U.S. PATENT DOCUMENTS

| | | | |
|---|---|---|---|
| 2,956,186 | 10/1960 | Wall | 310/51 |
| 3,010,041 | 11/1961 | Miller | 310/254 |
| 3,082,337 | 3/1963 | Horsley | 310/258 |
| 3,401,280 | 9/1968 | Lackey | 310/42 |
| 3,405,297 | 10/1968 | Madsen | 310/258 |
| 3,517,232 | 6/1970 | Sano | 310/214 |
| 3,838,502 | 10/1974 | Sheets | 310/45 |
| 4,012,653 | 3/1977 | Shigeta | 310/51 |
| 4,118,648 | 10/1978 | Gillet | 310/217 |

Primary Examiner—R. Skudy
Attorney, Agent, or Firm—Nathan D. Herkamp; James C. Davis, Jr.; Paul R. Webb, II

[57] ABSTRACT

Armature conductors are mounted to the ferromagnetic stator core of an AC machine by a plurality of flexible supports. Each support comprises a plurality of teeth interleaved with spacers having a discontinuity which creates a spring section on each tooth. The structure of the support provides a flexible mounting which will accommodate differential thermal expansion between the armature conductors and the stator core during operation while providing rigid attachment between the conductors and the stator core in the radial and azimuthal directions.

16 Claims, 4 Drawing Figures

SUPPORT STRUCTURE FOR ARMATURE CONDUCTORS

BACKGROUND OF THE INVENTION

This invention relates to AC machines, and particularly to such machines utilizing armature conductors mounted in the air gap on supports attached to the stator core.

In certain large AC machines, such as those having superconducting field coils, insulated armature conductor bars are mounted in the air gap between the stator and the rotor. A design requirement for such machines is a rigid attachment in the radial and azimuthal directions. The rigid attachment is necessary, in order for the connections between the conductor bars and the stator core to withstand the short circuit forces applied to the conductor bars when a sudden surge in armature current occurs, and to limit vibratory motion of the conductor bars under the influence of running forces.

In operation, an axially-long electrodynamic machine develops a heat concentration in the armature conductor bars due to the current passage therethrough. The iron stator core has a coefficient of thermal expansion different from that of the armature conductor bars normally made of copper. As a result, the conductor bars experience a different axial expansion from that experienced by the stator core. Therefore, an arrangement is required which provides a flexible connection in the axial direction between the armature conductor bars and the stator core.

A means of mounting armature conductors to a stator of an AC machine is disclosed in U.S. Pat. No. 3,405,297, to Madsen, issued Oct. 8, 1968. In that patent is disclosed a means of affixing armature conductors to the stator core by an axial wedge-shaped tooth which holds the insulated conductors by compression to the stator core. This provides the necessary rigid connection in two directions, but can accommodate axial thermal expansion only by slippage between the tooth and the conductors.

Another known technique for attaching armature conductors to a stator core is disclosed in U.S. Pat. No. 3,082,337, issued Mar. 19, 1963 to Horsley. In that patent is disclosed a method of embedding armature conductors in an insulating material in the air gap. The insulating material is cast molded with the conductors located in the casting. Again, the connection between the conductors and the supporting means is rigid in all directions. Differential thermal expansion, therefore, results in substantial stress at the interface between the conductors and the insulating supports.

In prior art techniques of attaching the armature conductors to stator core, the conductors were fitted into slots in mounting teeth and secured by mechanical means, such as wedges, or by adhesives. Mounting teeth were rigidly secured to the stator iron core, e.g., by adhesives. With either wedge or adhesive mounting of the armature conductors, the thermal expansion of the armature conductors due to heating by the armature current had to be accommodated by a relative slippage between the conductors and the mounting teeth. Resultant relative movement between armature conductors and the mounting teeth produced abrasion on the insulating material coating the armature conductors. This abrasion clearly was undesirable.

Armature conductor bars in AC machines are surrounded by an insulating layer having a limited mechanical capability to tolerate shear stress. When a conductor expands, a rigid axial mounting would cause all the stress created by the thermal expansion to be applied to the insulating material. The limited stress capabilities of the insulation require that some means be provided to allow for differential expansion between a stator iron core and the armature conductors, in elements other than the insulation.

The object of the present invention is to provide a mounting structure for armature conductors in AC machines which will provide rigid attachment in the radial and azimuthal directions, and also limit the axial shear load on the armature conductor insulation, due to relative motion caused by differential thermal expansion between the armature conductors and the stator iron core, to a level within the mechanical stress tolerance capabilities of the insulation material.

DESCRIPTION OF THE INVENTION

The invention of the instant application provides reinforced plastic teeth in the form of thin, wedge-shaped sheets separated by thin, wedge-shaped spacer plates of reinforced plastic material, having at least one discontinuity which provides a spring section adjacent the discontinuity on the teeth. A plurality of axially spaced stacks of teeth and spacer plates provides a rigid attachment between armature conductors and stator iron core in the radial and azimuthal directions and a flexible attachment in the axial direction.

BRIEF DESCRIPTION OF THE DRAWINGS

The features of the invention believed to be novel and unobvious over the prior art are set forth with particularity in the appended claims. The invention itself, however, as to organization, method of operation and objects and advantages thereof, may best be understood by reference to the following description taken in conjunction with the drawings wherein:

MANNER AND PROCESS OF MAKING AND USING THE INVENTION

Figure 1:
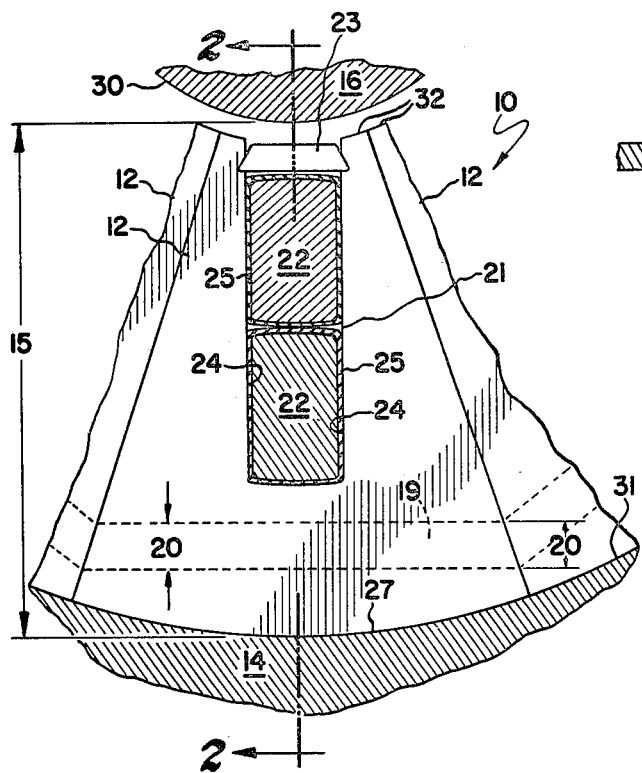
FIG. 1 is a vertical elevation view of the attachment means of the invention.

The particular structure shown in FIGS. 1 through 4 and described herein is merely exemplary, and the scope of the invention is defined in applicant's claims.

The mounting structure 10 illustrated herein incorporates a plurality of stacks 11 of teeth 12 separated by spacers 13 attached to an iron stator core 14 in the air gap 15 separating the stator core 14 (only partially shown) from the rotor 16 (only partially shown). In each instance a mounting tooth 12 is disposed at the far end of each stack 11. Each spacer 13 comprises a spacer plate 17, a spacer segment 18 and a gap 19 therebetween transverse to a radius 33 passing through the axis of rotation of the rotor and the center of the conductor bars 22. The gap 19 could be arcuate rather than straight as shown. The presence of gap 19 provides a predetermined amount of unsupported transverse area 20 in the mounting tooth (or teeth) adjacent thereto. This unsupported area 20 provides a spring section on each mounting tooth 12 over which the tooth can be made to deflect.

Figure 3:
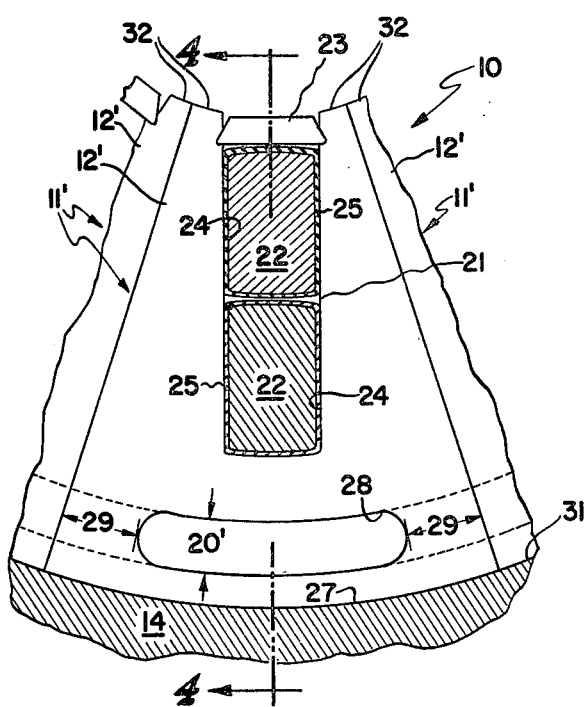
FIG. 3 is a view similar to FIG. 1 illustrating an alternative embodiment of the invention.

As shown in FIGS. 1 and 3, the mounting teeth 12 and spacer plates 17 have slots 21 in which are located insulated armature conductor bars 22 secured by being bonded to the slot surfaces 24 by a suitable adhesive, such as a heat-resistant polyester adhesive. In addition to the adhesive, a wedge member 23 may also be used to secure the conductor bars 22 in the slots 21. If used, wedge member 23 would be made of a material having thermal expansion characteristics similar to those of the armature conductor bars 22, so that no stress is applied to the insulation layer 25 of the armature conductor adjacent the wedge member 23.

The conductor bars 22 could be a solid copper or other conductive material, or a bundle of conductive wires embedded within an insulating resin and covered by a layer 25 of insulating material. More typically, the conductor bars 22 comprise a stack of conductive strips embedded within an insulating resin and coated with a layer 25 of insulating material. The conductor bars 22 may also be configured to provide cooling passages for flow of a coolant fluid of any conventional type. The support system disclosed herein will provide the advantageous connection for each of these types of armature conductor bar structure and any other conductor bar internal structure. The internal bar structure is immaterial to the invention described herein, so long as the outer surface of the insulation layer conforms generally to the shape of the slots 21. The conductor bars 22 may be parallel to the longitudinal axis of the machine or may be skewed relative to the longitudinal axis.

In a long machine, a plurality of spaced stacks 11 of teeth 12, interleaved with spacers 13, both of fiber reinforced plastic material, are provided with a gap 26 between the stacks 11, so that the thermal expansion of the iron stator core 14 to which these stacks 11 are bonded by adhesive does not apply intolerable stress to the adhesive joint 27. Although the description herein has been limited to a single tooth stack, the same construction is repeated all around the inner cylindrical surface of the stator core 14, as shown in FIGS. 1 and 3 by the broken section of adjacent teeth.

The teeth 12 are normally made of a cloth or glass fiber reinforced plastic material with an epoxy impregnant. The spacers 13 may be made of material identical or similar to the tooth material. The teeth 12 and spacers 13 are bonded by a polyester epoxy or other heat-resistant adhesive, or, alternatively, they may be bonded by heating under pressure to produce adhesion between the adjacent surfaces of the teeth 12 and spacers 13, to form the laminated stacks 11. The teeth 12 and spacers 13 are bonded to the stator iron core 14 at joint 27 by a suitable adhesive such as a heat-resistant polyester adhesive, e.g., a polyester epoxy.

The teeth 12 and spacers 13 may be of the same thickness or different thicknesses. The spacers 13 must be of adequate thickness to provide separation between the adjacent surfaces of adjacent teeth so that at maximum deflection the surfaces of adjacent teeth do not meet in the unsupported transverse area 20. Contact between adjacent teeth in the area 20 would interfere with the desired accommodation of thermal expansion of the armature conductors by frictional resistance to relative motion.

The stacks 11 of teeth 12 and spacers 13 may be of any appropriate width to provide adequate strength in the azimuthal and radial directions without subjecting the adhesive bond 27 between the stack 11 and the stator core 14 to intolerable shear stress due to thermal expansion of the iron stator core 14. The gap 26 is provided between adjacent stacks 11 to limit the stress on the adhesive joint 27 to that created by the thermal expansion of the stator iron core 14 in the axial length over which the stator core 14 is attached to each stack 11. Due to the wedge shape and structural strength of the reinforced plastic material, adequate rigidity and strength for support are provided in the azimuthal and radial directions to withstand the short-circuit forces and to limit vibratory motion under the influence of running forces. The short-circuit forces are the forces applied to the armature conductors when a fault current is applied to the conductors in the presence of the machine magnetic field. These forces tend to move the conductors in the radial and azimuthal directions. The vibratory motion created by running forces in the machine is due to the mechanical interaction and electromagnetic effects of the interaction between armature current and machine magnetic field when the machine is operating.

Figure 2:
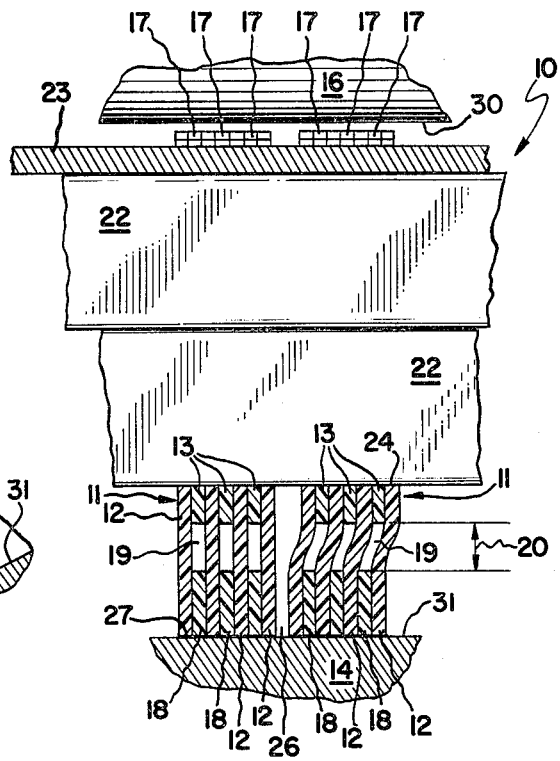
FIG. 2 is a cross sectional view of FIG. 1 taken along line 2—2 showing a deflected and undeflected stack of teeth and spacers.

As shown in FIG. 2, the adjacent stacks 11 can accommodate differential thermal expansion by the iron stator core 14 and armature conductor bars 22 because of the spring section 20 created by the transverse gap 19 between spacer plates 17 and spacer segments 18 whereby the stacks 11 of teeth 12 can deflect in the axial direction. With the instant invention, the spring section 20 of each mounting tooth 12 allows independently-bonded sections of the armature conductors 22 to move axially relative to other sections of the conductors without applying any severe stress to the conductor bar insulation layer 25. The stacks 11 of teeth 12 and spacers 13 are of such a width that the expansion in the incremental axial length of a conductor bar 22 attached to a single stack 11 does not apply a thermal stress to the layer 25 of insulation beyond the stress tolerance limits of the insulation material.

In order to prevent creep of the armature conductor bars 22 due to repeated expansion and contraction due to heating and cooling caused by intermittent use, or other operating variations, the bars 22 are usually attached at one location with a rigid connection in all directions. Thereby, no relative motion can occur between the stator core 14 and the conductor bars 22 at the point of rigid attachment. The disclosed mounting structure 10 providing spaced attachment between the stator core 14 and conductor bars 22 provides accommodation of incremental thermal expansion. By selecting the thickness of spacers 13, the required maximum deflection at the mounting stacks 11 farthest from the rigid attachment can be accommodated.

Figure 4:
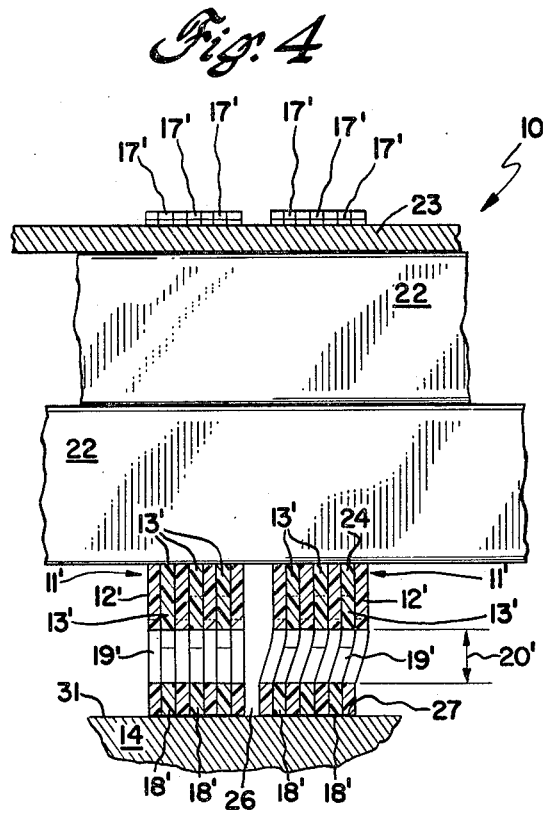
FIG. 4 is a cross sectional view of FIG. 3 taken along line 4—4 showing a deflected and undeflected stack of teeth and spacers.

In a set of design conditions in which it is decided that the expansion should be from the center out, a stack 11 of teeth 12 without a spring section 20 may be affixed to the conductor bar insulation layer 25 at the axial center of the machine to securely locate the armature conductors 22 relative to the stator core 14. As shown in FIGS. 2 and 4, the degree of deflection for adjacent stacks of teeth may differ. This would generally occur for stacks at different distances from the rigid attachment.

At the ends of the machine, conventional shaping of the conductor bars 22 allows for thermal expansion of the conductors without any mechanical interference with other parts of the machine.

An alternative embodiment of the invention is illustrated in FIGS. 3 and 4. In FIG. 3 is shown a stack 11' of mounting teeth 12' having an arcuate oblong slot 28 coincident with an arcuate gap 19' between spacer plate 17' and spacer segment 18' of the spacers 13', which provides an enhanced flexibility spring section 20' to the stacks 11' of mounting teeth 12'. The gap 19' and the oblong slot 28 could be straight transverse openings rather than arcuate as shown. As shown in FIG. 4, the slots 28 provide for a limited cross sectional area 29 of the fiber reinforced plastic teeth 12' in the spring section 20'. The size of this area 29 is determined by the required azimuthal and radial rigidity and strength requirements. By using the slots 28 shown in FIGS. 3 and 4, the tooth thickness may be increased to provide additional strength, along with increased flexibility.

The conductor bars 22 may be constructed to have coolant passages and be cooled by water or other suitable coolant circulating therethrough. The differential thermal expansion of either a cooled or uncooled conductor bar arrangement would be accommodated by the present invention.

The mounting arrangement disclosed herein could be used in a wide range of machine sizes. The preferred range contemplated by applicant is from approximately 20 MW up to the largest AC machine. In generators having a power rating of 300 MW to 1200 MW the air gap 15 from rotor surface 30 to stator core surface 31 is approximately 8 to approximately 12 inches. The height of the support stacks for generator of such ratings would be such as to allow mechanical clearance between the rotor surface 30 and the upper limit 32 of the teeth of approximately 1 inch, and the height of the spring section 20 would be from approximately one-half inch to two inches.

BEST MODE

The best mode contemplates utilization of a straight transverse gap 19 in the spacer 13. The best mode of the instant invention contemplates the utilization of a mica resin insulation system on the conductor bars of the type sold under the trademark Micapal II, a trademark of the General Electric Company. The teeth and spacers are made of industrial laminates of the type sold under the trademark Textolite, also a trademark of the General Electric Company, formed of fiber (e.g. of cloth or glass) reinforced plastic material impregnated with an epoxy resin. The best mode also contemplates a thickness of approximately 30 to approximately 60 mils for both the teeth and spacers. The height of the spring section 20 is approximately 1 inch. Also, each stack 11 of teeth 12 and spacers 13 is approximately one inch wide in the axial direction. The teeth 11 are bonded to the conductor bar insulation layer 25 by a heat-resistant polyester epoxy adhesive.

The arrangement described herein provides rigid azimuthal and radial attachment of armature conductor bars to the stator iron core in an electrodynamic machine, such as an AC generator, without allowing intolerable stresses to be applied to the insulation layer surrounding the conductor bars.

While preferred features and the best mode of the invention have been shown, many modifications and changes will occur to those skilled in the art. It is, therefore, to be understood that the appended claims are intended to cover all such modifications and changes as fall within the true spirit of the invention.

I claim:

1. In an electrodynamic machine having an annular cylindrical ferromagnetic stator core and a cylindrical rotor rotatably mounted coaxially therewith and separated therefrom by an annular cylindrical air gap, the improvement comprising:

a plurality of insulated longitudinally-extending armature conductors uniformly spaced circumferentially within said air gap;

a plurality of electrically nonconducting means for supporting said armature conductors at spaced locations therealong relative to said stator core, each of said supporting means comprising a plurality of generally coplanar wedge-shaped composite members;

each of said members comprising a stack of spaced mounting teeth and spacer members interleaved therewith, each said stack having a slot therethrough for insertion of the conductors being supported, said mounting teeth and said spacer members being bonded to said conductors;

said spacer members each having a discontinuity generally transverse to a radius passing through said conductors defining a hole between adjacent mounting teeth, the mounting tooth area axially adjacent each said discontinuity, respectively defining a boundary of each hole, respectively providing a spring section in each of said teeth, respectively to allow axial expansion of said conductors without relative slipping between said mounting teeth and said conductors.

2. The improvement of claim 1, wherein the teeth and spacers are of the same thickness.

3. The improvement of claim 2, wherein the teeth and spacers are formed of fiber reinforced plastic.

4. The improvement of claim 3, wherein the teeth and spacers are formed of glass fiber reinforced plastic.

5. The improvement of claim 1, wherein the armature conductors are covered by a layer of mica-resin insulation.

6. The improvement of claim 1, wherein the conductors are bonded to the teeth and spacers by an adhesive.

7. The improvement of claim 1, wherein the discontinuity is a straight gap.

8. The improvement of claim 7, wherein each tooth has an oblong hole adjacent the discontinuity in the spacers adjacent said tooth.

9. The improvement of claim 1, wherein the teeth and spacers are arranged in a plurality of axially spaced stacks.

10. The improvement of claim 1, further comprising an axially-extending wedge means for securing the conductors in the slot.

11. The improvement of claim 1, further comprising a rigid mounting stack for rigidly securing said conductors to said stator core in the region of said one rigid mounting stack.

12. The improvement of claim 11, further comprising a plurality of adjacent stacks wherein the thickness of the teeth of said stacks differs from the thickness of the teeth of stacks located at a different axial distance from said one rigid mounting stack.

13. The improvement of claim 11, wherein each tooth of the stacks, other than the rigid mounting stack, has an oblong hole adjacent the discontinuity in the spacers adjacent said tooth.

14. The improvement of claim 13, further comprising a plurality of adjacent stacks wherein the thickness of the teeth of one stack differs from that of the teeth of another stack located at a different axial distance from said rigid mounting stack.

15. The improvement of claim 1, wherein the discontinuity is an arcuate gap.

16. The improvement of claim 15, wherein each tooth has an arcuate oblong hole adjacent the discontinuity in the spacers adjacent said tooth.

* * * * *